(12) United States Patent
Abe

(10) Patent No.: US 7,198,063 B2
(45) Date of Patent: Apr. 3, 2007

(54) MULTI-PATH JOINT AND MANUFACTURING METHOD THEREOF

(75) Inventor: Koichi Abe, Gyoda (JP)

(73) Assignee: Surpass Industry Co., Ltd., Saitama-Ken (JP)

( * ) Notice: Subject to any disclaimer, the term of this patent is extended or adjusted under 35 U.S.C. 154(b) by 277 days.

(21) Appl. No.: 10/868,441

(22) Filed: Jun. 14, 2004

(65) Prior Publication Data

US 2005/0274421 A1   Dec. 15, 2005

(51) Int. Cl.
*F17D 1/00* (2006.01)
(52) U.S. Cl. .................. 137/606; 137/271; 137/884
(58) Field of Classification Search ........... 137/269, 137/271, 606, 884
See application file for complete search history.

(56) References Cited

U.S. PATENT DOCUMENTS

| | | | | |
|---|---|---|---|---|
| 526,761 A | * | 10/1894 | Wattles | 137/512 |
| 3,572,366 A | * | 3/1971 | Wiggins | 137/240 |
| 4,080,983 A | * | 3/1978 | Stumpmeier | 137/271 |
| 4,874,014 A | * | 10/1989 | Grant et al. | 137/606 |
| 4,955,407 A | * | 9/1990 | Inoue | 137/454.2 |
| 5,035,262 A | | 7/1991 | Schweikert | |
| 6,192,932 B1 | * | 2/2001 | Izumo et al. | 137/606 |

\* cited by examiner

*Primary Examiner*—Stephen M. Hepperle
(74) *Attorney, Agent, or Firm*—Thelen Reid Brown Raysman & Steiner LLP (57) ABSTRACT

A housing of a multi-path joint is divided into a plurality of blocks in correspondence with the number of lead-in ports, and a reverse-stop valve for preventing mixed fluid in the main path from flowing backward is provided between the lead-in ports and the main path. Each of the plurality of blocks formed by dividing the housing is provided with a connecting section for positioning when joining to adjacent blocks, and a holding unit is provided for connecting all the blocks in their respective connecting sections and maintaining a connected state between them. According to this multi-path joint, mixed fluid which flowing along the main path, does not flow backward to lead-in ports, and therefore, the atmosphere in the lead-in ports is stabilized. In addition, the multi-path joint is highly functional, being speedily adaptable to the number and shape of the paths on the lead-in port side.

16 Claims, 6 Drawing Sheets

MULTI-PATH JOINT AND MANUFACTURING METHOD THEREOF

BACKGROUND OF THE INVENTION

1. Field of the Invention

This invention relates to a multi-path joint for joining various paths along which a variety of fluids flow, mixing the fluids together, and sending them downstream, and to a method for manufacturing the joint. Priority is claimed on Japanese Patent Application No. 2002-363611, filed Dec. 16, 2002, the content of which is incorporated herein by reference.

2. Description of the Related Art

There is a conventional joint for mixing together fluids by joining together a plurality of paths along which the fluids flow. The joint constitutes what is referred to in this invention as a multi-path joint, and has a function of connecting a great number of paths positioned upstream to at least one path positioned downstream.

One example of a general structure of this joint is explained below. Multiple lead-in ports for leading in multiple fluids are fitted to a housing, which forms the outer shape, and these lead-in ports are connected to a main path that runs through the inside of the housing. Since the multiple lead-in ports all lead to the main path, the fluids from each of the lead-in ports converge in the main path, and flow along it in a mixed state. The mixed fluids can then be led out simultaneously from at least one lead-out port, provided in an end face of the housing at the end of the main path.

This type of multi-path joint is used to discharge various fluids used in manufacturing semiconductors and the like as waste fluid, or in mixing fluids of various elements to supply one mixed fluid.

In this type of multi-path joint, since the lead-in ports on the inflow side for the multiple fluids are all joined via the main path to the lead-out ports on the outflow side for the converged fluids, when the flow of the fluid become slower, fluid amount becomes insufficient, and fluid pressure becomes lower as a result of the insufficient fluid amount, or the like, the mixed fluid in the main path may flow backwards to one of the lead-in ports.

When this happens, it can easily be envisaged that fluids of other elements in the upstream path connecting to the lead-in ports become mixed, and, in a worst case, there is a possibility that the mixed fluids will chemically react with each other, contaminating the atmosphere upstream of the main path.

Of course, since all the fluids are mixed in the main path, restrictions must be introduced to reduce reactions in the main path, such as using an alkaline or acidic solution, although reactions in the main path can be overlooked when the joint is provided with the aim of discharging all the fluids simultaneously. However, when fluids that flow independently along a path become mixed therein, neither the path nor the fluids can be used again.

Furthermore, when the joint is used for mixing fluids, chemical reactions between the mixed fluids are avoided by prior planning, and mixing in the main path presents no particular problem since that is the intention. However, when the mixed fluids flow backwards and become mixed into their respective paths, the elements of the fluids may change and cause considerable problems.

Figure 6:
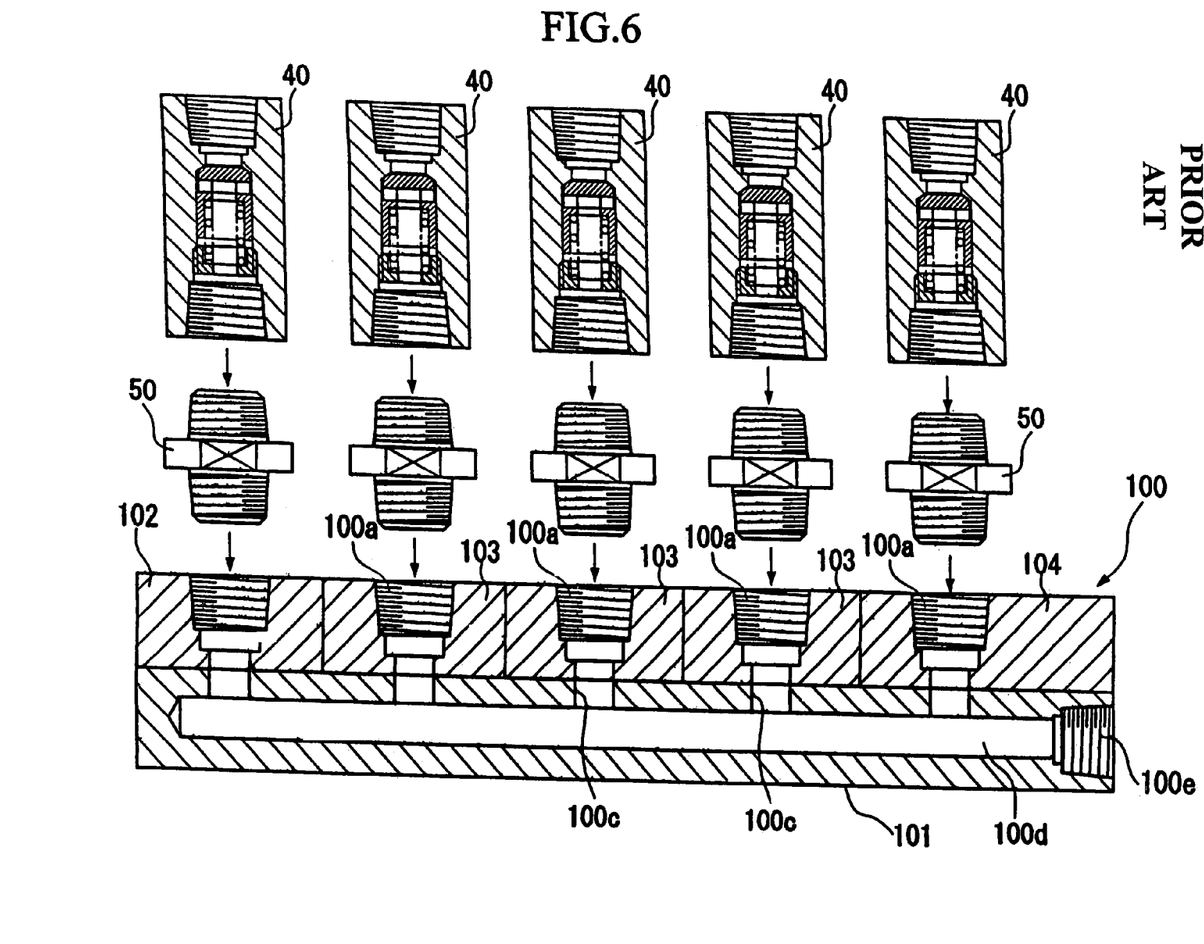
FIG. 6 is a cross-sectional view to illustrate an example of a conventional multi-path joint.

FIG. 6 shows a conventional method for preventing contamination of the atmosphere upstream caused by mixed fluid counterflow, wherein the paths are connected by reverse-stop valves 40, newly fitted to the lead-in ports 100a. In this method, adaptors 50 must be fitted between the respective reverse-stop valves 40 and the lead-in ports 100a.

Furthermore, there is a conventional multi-path joint, which prevents the mixed fluid from flowing backwards toward the lead-in ports by providing a valve that seals the path between main path and the lead-in ports in the housing, the valve being controlled from the outside to open and seal the path leading to the lead-in ports (as shown in FIG. 2 of U.S. Pat. No. 5,035,262, for example).

In the structure disclosed in this multi-path joint, the motive force of a motor is converted via a gear to the operation of valves, which can be individually operated to open and seal each path individually. These valves are operated by externally controlling the power supplied to the motor.

In another structure, butterfly dampers are provided midway between each lead-in port and the main path, or at the end, the butterfly dampers being opened and closed by an external supply of air or the like.

The above-mentioned two structures for preventing mixed fluid in the main path from flowing backwards to the lead-in ports have at least one of the problems of being costly to install in the circuit, difficult to manufacture, expensive to manufacture, and incompatible for multiple path connection.

Firstly, the method of fitting the reverse-stop valves 40 to the lead-in ports 100a as shown in FIG. 6 has problems in that it requires a fitting operation for every single lead-in port 100a, and, in addition, greatly increases the size of the multi-path joint 100 after the reverse-stop valves 40 have been fitted. The former structure requires time prior to installation, and the latter structure may make it impossible to install in the fluid circuit due to space restrictions. Furthermore, the increased number of connecting portions makes leakage more likely, and requires additional check of these connecting portions to prevent leakage.

Secondly, since there are no particular limitation regarding the number of upstream paths that are connected by a multi-path joint, a plurality of multi-path joints having various numbers of lead-in ports must be kept in stock. Alternatively, when the multi-path joint is manufactured in response to a request for a multi-path joint having a stipulated number of lead-in ports, it may not be possible to meet the customer's deadline, losing the customer's trust.

The multi-path joint shown in FIG. 6 enables the housing to be divided for each of the lead-in ports 100a, but requires a pedestal 101 containing the main path in order to secure the divided blocks 102, 103, and 104 when they have been connected. As a result, various pedestals 101 must be manufactured in accordance with the required number of lead-in ports 100a. Therefore, although this structure enables the diameter of each lead-in port 100a to be easily altered, it cannot easily achieve a multi-path joint that can easily be compatible with various numbers of fluids.

In addition, in the above-mentioned structures for providing valves or butterfly dampers inside the paths and opening and sealing the paths from the outside by using a motor air and the like, there are problems in that the structure of the multi-path joint becomes complex, and the cost is considerably increased due to the number of components and the need to install a control circuit.

SUMMARY OF THE INVENTION

This invention has been realized after consideration of the above, and aims to provide a multi-path joint capable of stabilizing the upstream atmosphere by preventing mixed fluids, which flow in a main path, from flowing backwards, the multi-path joint also being easily compatible with various numbers and shapes of paths on the in-flow side.

This invention uses the following means to achieve the above objects.

A first aspect of the invention provides a multi-path joint comprising, in a housing: a plurality of lead-in ports for leading in a plurality of fluids; a main path, connecting to each lead-in port and joining the fluids together; a lead-out port, leading out mixed fluid from the inside of the main path. The housing is divided into a plurality of sections in correspondence with the number of the lead-in ports. A reverse-stop valve is provided between the lead-in ports and the main path, and prevents counterflow of the mixed fluid from the main path.

According to this structure, the fluids are fed from the lead-in ports into the housing, and pass through the reverse-stop valve to the main path, where they mix with other fluids, and are finally led out from the lead-out port. As a result, the action of the reverse-stop valve prevents the mixed fluid in the main path from flowing backward to the lead-in ports side, so that the atmosphere upstream from the reverse-stop valve is kept constant. Consequently, it possible to prevent chemical reactions, changes in fluid density, and the like, upstream from the multi-path joint, while mixing, discharging, or supplying the fluids correctly. Furthermore, since the housing can be divided, the multi-path joint can easily be adapted in accordance with the number of fluids to be led in.

Incidentally, the housing is divided into a number of sections that corresponds to the number of lead-in ports, it being acceptable to divide the housing so that there is one section for each lead-in port, or two or more for each lead-in port.

In a second aspect of the invention, the multi-path joint as described in the first aspect further comprises a connecting section provided in each of blocks formed by dividing the housing, the connecting sections positioning each block in respect to its adjoining blocks, and a holding unit for connecting all the blocks in their respective connecting sections and maintaining a connected state.

According to this structure, adjacent blocks are positioned and joined by their respective connecting sections, and a section provided in each block is aligned with a corresponding section provided in another block. For instance, the main path is arranged along a single axis, and the blocks are joined together to form the main path having a uniform cross-sectional shape. Furthermore, the holding unit holds the blocks in their correctly joined state.

Furthermore, since the positions for connecting the blocks can be stipulated, the multi-path joint can be easier to assemble and more rigid, and its airtight sealing properties are increased. Moreover, it is easier to position the main path around a single axis, so that the mixed fluid can be led smoothly along it.

According to a third aspect of the invention, in the multi-path joint described in the first and second aspects, each block formed by dividing the housing comprises a first case having an attachment groove for the reverse-stop valve and part of the main path, and a second case having the lead-in ports. In addition, a sealing member is provided at an opening of the second case corresponding to the lead-in ports.

According to this structure, the reverse-stop valve is inserted into the attachment groove of the first case from upstream in the direction of the fluid flow; furthermore, the sealing member of the second case maintains the airtight seal between the contacting faces of the first and second cases, functioning as a valve stand in the reverse-stop valve while also having the function of sealing the path. As a result, the structure of the joint is simplified and the cost can be reduced. Furthermore, the reverse-stop valve, which was difficult to install in the structure where the plurality of paths were joined to the main path, can be easily and accurately installed.

A fourth aspect of this invention provides a method for manufacturing a multi-path joint comprising, in a housing, a plurality of lead-in ports for leading in a plurality of fluids, a main path, connecting to each lead-in port and joining the fluids together, and a lead-out port, leading out mixed fluid from the inside of the main path. In this manufacturing method, each block formed by dividing the housing comprises a first case having an attachment groove for the reverse-stop valve and part of the main path, and a second case having the lead-in ports. In addition, step sections are provided in contacting faces of the first and second cases. These step sections are connected together, and the cases are joined by applying ultrasonic waves to the contacting face of at least one of the cases.

According to this manufacturing method, the second case having lead-in ports of various apertures is attached to and assembled with the first case, which the reverse-stop valve is fitted. In addition, the block being speedily and easily assembled by ultrasonic wave joining. In other words, although in a multi-path joint that is required to handle a wide variety of apertures due to its having a plurality of lead-in ports, a wide variety of connections required by the lead-in ports can be dealt with merely by replacing the second case, which can be easily fitted. As a result, there is no need to manufacture beforehand multi-path joints having a great variety of apertures, and that the multi-path joint can be assembled speedily while matching the required apertures, enabling an earlier deadline for the customer to be met. This avoids accumulating a stock of multi-path joints.

Furthermore, step sections are provided at the join between the first and second cases, positioning them at the time of their assembly and maintaining an airtight seal between their contacting faces.

According to a fifth aspect of this invention, in the multi-path joint manufacturing method described in the fourth aspect, an interface between the faces forming a dent of the step section, provided on at least one of the cases, is made to protrude, and is attached and joined to an edge formed on the other step section.

According to this manufacturing method, in joining the first and second cases by using ultrasonic waves, the step sections contact and polish each other locally, thereby creating a section that is absolutely contacting in part. As a result, the airtight sealing properties of the contacting faces of the first and second cases can be increased.

DESCRIPTION OF THE PREFERRED EMBODIMENTS

Preferred embodiments of the multi-path joint according to this invention will be explained with reference to the diagrams. Fluoride resin is used for the housing of the multi-path joint 1, so that it can mix and discharge a plurality of liquid medicines used in the manufacture of semiconductors. However, it goes without saying that the following explanation of the multi-path joint of this invention should not be interpreted as limiting it to this structure.

Figure 1:
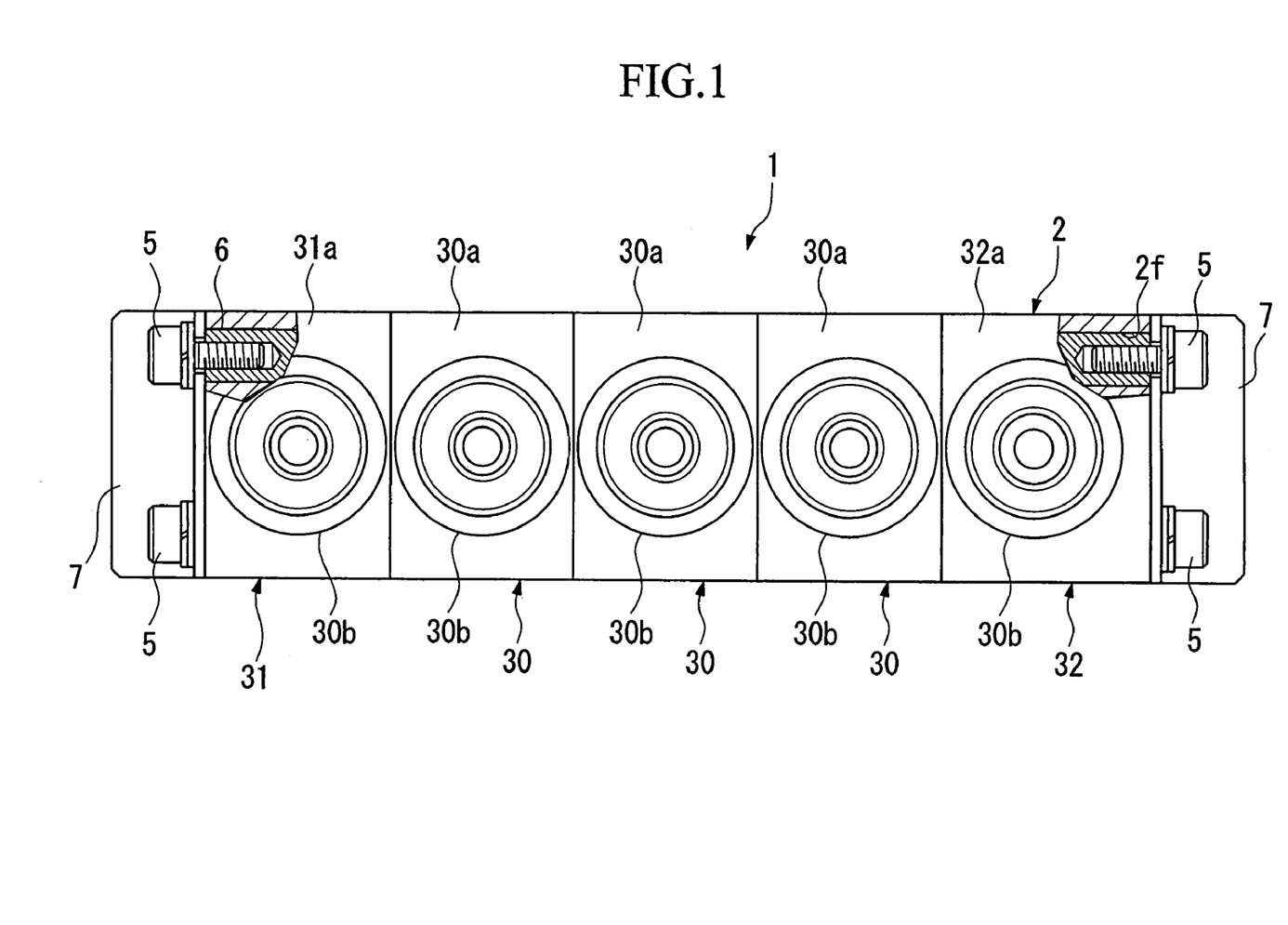
FIG. 1 is a plan view of a multi-path joint according to an embodiment of this invention.
Figure 2:
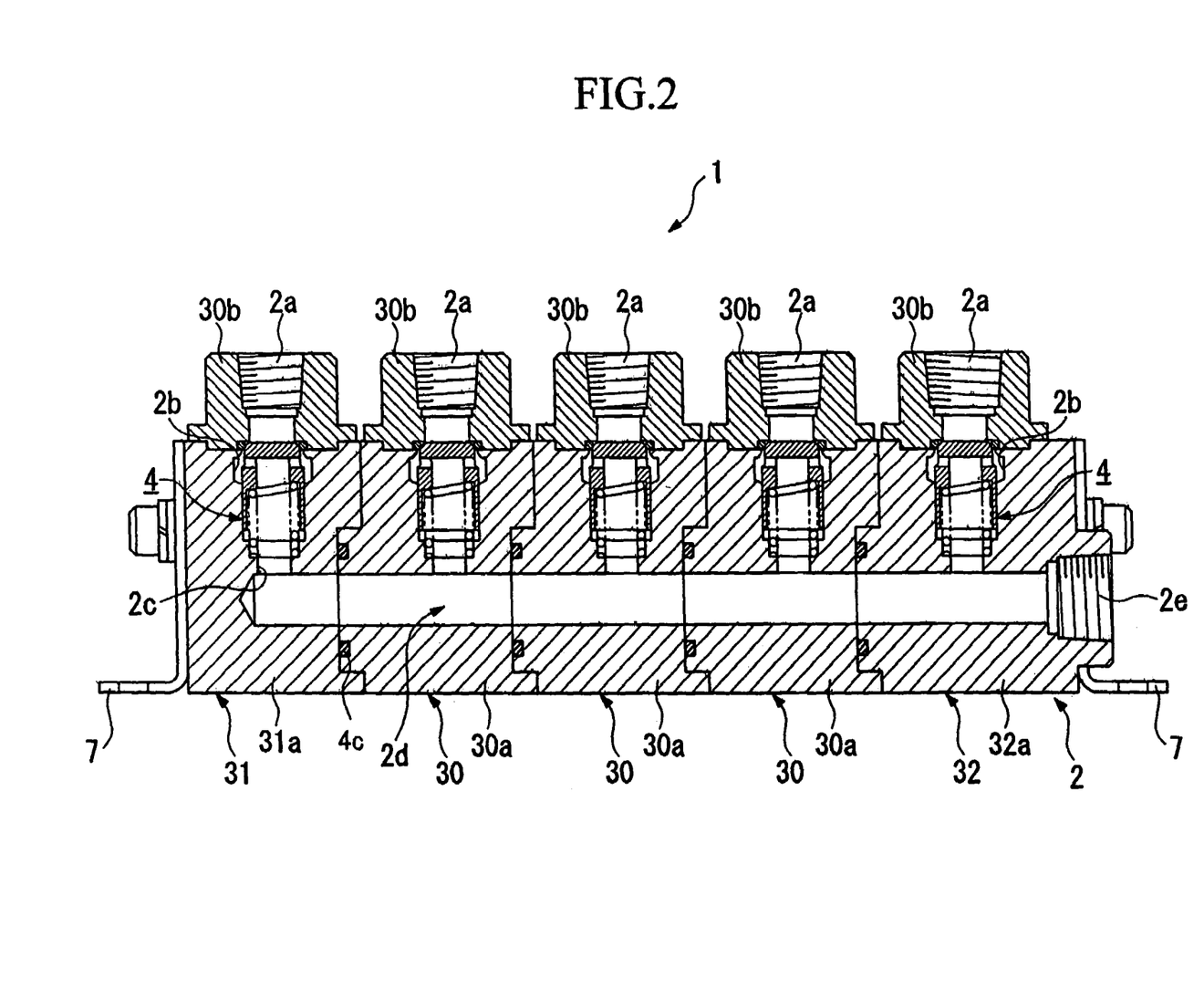
FIG. 2 is a cross-sectional view of an axis of a main path to illustrate the structure of the multi-path joint according to an embodiment of this invention.
Figure 3A:
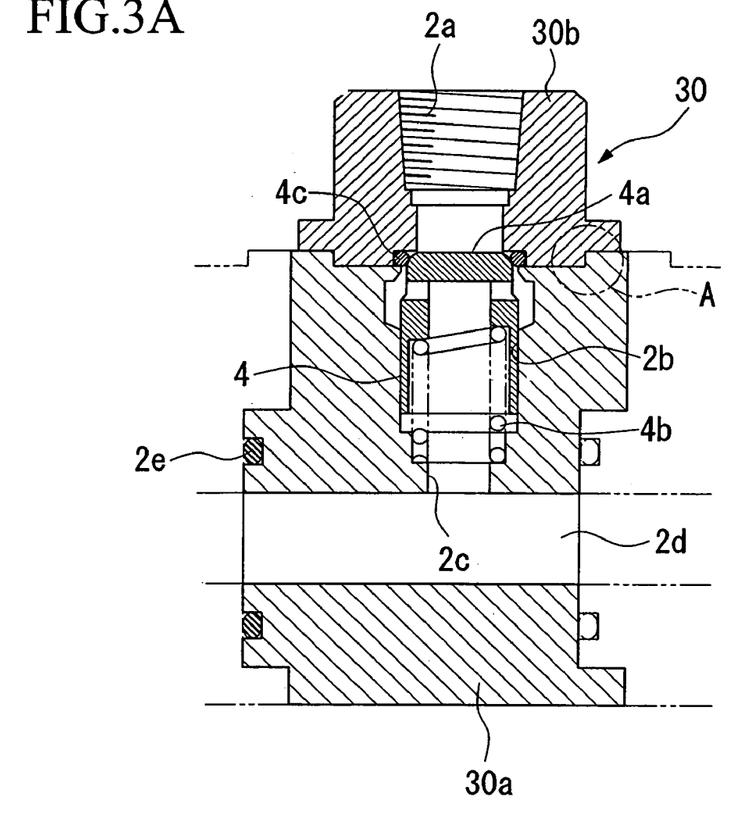
FIG. 3A is a cross-sectional view of the entire block to illustrate the structure of one block forming the multi-path joint shown in FIG. 2.
Figure 3B:
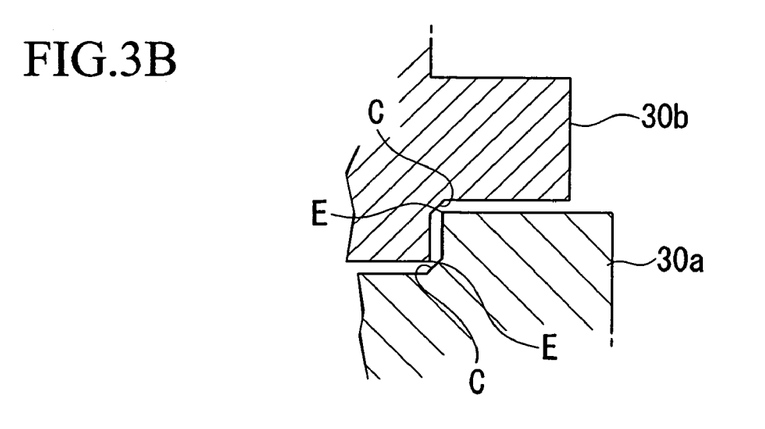
FIG. 3B is an enlarged cross-sectional view of the area indicated by reference numeral A in FIG. 3A to illustrate the structure of one block forming the multi-path joint shown in FIG. 2.

FIG. 1 is a plan view of an embodiment of the multi-path joint, and FIG. 2 is a side cross-sectional view including an axis of a main path to illustrate the internal structure of the multi-path joint. FIG. 3A is a side cross-sectional view showing an enlargement of one block comprising the multi-path joint shown in FIG. 2, and 3B is an enlargement of the area indicated by reference numeral A shown in FIG. 3A.

As shown in FIGS. 1 and 2, the multi-path joint 1 (hereinafter referred to as "main body 1") comprises a plurality of blocks 30, 31, and 32 which are formed by dividing a housing 2 in a one-to-one correspondence with a plurality of lead-in ports 2a. That is, in this embodiment, the main body 1 is divided into five blocks 30, 31, and 32, in correspondence with five lead-in ports 2a.

That is, one lead-in port 2a, which an upstream path connects to, is provided to each of the blocks 30, 31, and 32; in addition, each of the blocks 30, 31, and 32 has a section for a main path 2d, formed at a right-angle to the axis of the lead-in ports 2a, and one reverse-stop valve 4 that will be explained later.

The intermediate block 30, positioned between blocks 31 and 32, has indented or protruding connecting sections for stipulating a predetermined position for connecting it to the adjacent blocks on each side. An O-ring 2e is provided in the side wall of each protruding connecting section and surrounds the opening in the main path 2d, preventing leakage from the main path 2d, which is divided with the blocks 30, 31, and 32.

The blocks 31 and 32 on each side of the main body 1 are shaped differently to the middle block 30, block 31 (on the left side of FIGS. 1 and 2) having a section of the main path 2d that does not pass through block 31, in order to provide a section for the starting point of the main path 2d, and block 32 (on the right side of FIGS. 1 and 2) having a lead-out port 2e forming the end point of the main path 2d.

The indented or protruding connecting sections are formed in one wall face of each of the blocks 31 and 32, these being the walls facing the center side of the main body 1.

A through-hole 2f passes through all the blocks 30, 31, and 32, in parallel to the axis of the main path 2d. A hollow pipe 6 has approximately the same length as the main body 1 when the blocks 30, 31, and 32 are joined together, and has screw grooves in the inside wall faces of both ends; the pipe 6 is inserted into the through-hole 2f. Bolts 5 are screwed into the screw grooves so that the plurality of blocks 30, 31, and 32 are pressed by these bolt 5 to the center of the main body 1 along the axis of the main path 2d. As a result, the blocks 30, 31, and 32 are held in a joined state. When assembled, the through-hole 2f, the pipe 6, and the bolts 5 constitute a holding unit of this invention.

The pipe 6 does not have to be hollow, and may instead comprise a solid rod with screw holes at each end. Reference numeral 7 represents metal fittings for securing the main body 1 in the installation position, the metal fittings 7 being provided at both ends of the main body 1 and securing it via the bolts 5.

Subsequently, the structure of the blocks 30, 31, and 32 will be explained in further detail by illustrating the block 30 which is positioned in the middle of the main body 1, as an example. The other blocks 31 and 32 have substantially the same structure as the middle block 30, with the exception of the differences already mentioned above, and for this reason they will not be explained.

The block 30 is formed by combining a first case 30a fitted with a reverse-stop valve and a second case 30b fitted with a lead-in port, ultrasonic waves being used to join them. The second cases 30b in the following explanation have lead-in ports 2a of differing apertures, but can be used in all the first cases 30a, 31a, and 32a.

The first case 30a has a path forming part of the main path 2d, a connecting section for positioning the connection of the adjacent blocks, and a attachment groove 2b for a reverse-stop valve 4, provided in the path 2c that leads to the main path 2d; the reverse-stop valve 4 comprises a valve body 4a and a spring 4b, and is installed in the attachment groove 2b. An indented step section is cut into a circular shape, and is formed in the face contacting the second case 30b (the top face as shown in FIG. 2).

The second case 30b comprises a lead-in port 2a that matches the aperture of a connecting pipe (including an adaptor and the like), and has a path at the far side of the lead-in port 2a, running through block 30. An O-ring 4c (sealing member) is provided around the opening of this path, and maintains an airtight seal between the first case 30a and the second case 30b. A circular protruding step section is provided in the face of the second case 30b that contacts the first case 30a, and can interlock with the indented step section formed in the first case 30a.

Explaining the shapes of the step sections of the cases 30a and 30b in more detail, as shown in FIG. 3B, a section C that protrudes at the interface between the faces forming the right-angled dent of the step section is provided in each of the interlocking front step sections. The sections on the other sides protruding to the sections C have right-angled edges E.

The following is a method for joining the first case 30a to the second case 30b.

The reverse-stop valve 4 is fitted into the attachment groove 2b of the first case 30a, and the O-ring 4c is fitted to the second case 30b. The second case 30b is then connected to the first case 30a with their step sections interlocked. At this time, the second case 30b is pressingly attached to the first case 30a while maintaining a sound level at which ultrasonic waves are generated.

Consequently, by interlocking the step sections, the second case 30b is installed at a predetermined position with respect to the first case 30a, and the ultrasonic waves polish the contacting faces so that they fuse slightly, joining the first case 30a and the second case 30b together. In particular, since the sections in FIG. 3B where the sections represented by reference numeral C meet the edges E are joined by ultrasonic waves, a sealed join without gaps near the step sections is achieved. This airtight seal between the contact faces is further increased by applying the O-ring 4c.

The O-ring 4c provided between the first case 30a and the second case 30b maintains an airtight seal between the contact faces, and, in addition, the inner side of the O-ring 4c strikes the valve body 4a, thereby functioning as a pedestal for the valve body 4a. In other words, when the valve body 4a is lifted toward the top of FIG. 3A by the spring force of the spring 4b, it touches the O-ring 4c and seals the path.

Subsequently, a manufacturing method of the main body 1 will be explained.

To manufacture the blocks 30, 31, and 32, required for the main body 1, the second cases 30b, which comprise lead-in ports 2a having the required aperture, are attached by ultrasonic waves in the manner described above to each of the first cases 30a, 31a, and 32a, in which the reverse-stop valve 4 having been attached. Of course, parts such as the main path 2d, the lead-in ports 2a, the through-hole 2f for inserting the pipe 6 and the like, have been formed in the first and second cases 30a, 31a, 32a, and 30b, prior to this stage.

Next, the pipe 6 having the appropriate joining length is prepared, the pipe 6 and the securing metal fittings 7 are attached to the blocks 30, 31, and 32, which have been joined to the connecting sections, and the bolts 5 are screwed into the pipe 6. This holds the blocks 30, 31, and 32 in a joined state, completing the main body 1 having lead-in ports 2a with apertures matching those requested by the customer, the number of lead-in ports 2a corresponding to the number of paths to be connected.

The main body 1 is installed in the fluid circuit by using the securing metal fittings 7, pipes for supplying fluids are connected to each of the lead-in ports 2a, and a pipe for discharging the mixed fluid is connected to the lead-out port 2e, whereby installation is complete.

Incidentally, in the event that the number of lead-in ports 2a is insufficient due to circuit modification or the like, this problem can be dealt with simply by replacing the pipe 6 in order to add intermediate blocks 30.

Subsequently, the function of using the main body 1 to mix and discharge a plurality of fluids will be explained. When the fluids arrive from upstream of the lead-in ports 2a, and a pressure state is obtained that exceeds the sum of the pressure state on the main path 2d side and the spring force of the spring 4b, the valve body of the reverse-stop valve 4 moves downward, opening a path that is specific to this state. Then, fluid from the path opened by the reverse-stop valve 4 flows into the main path 2d, mixes with fluids flowing similarly from other paths, and is discharged from the lead-out-port 2e.

At the stage where the pressure upstream from the lead-in ports 2a has dropped (i.e. the stage where the supply and discharge of fluid upstream from the main body 1 has stopped), the reverse-stop valve 4 midway along this path is closed, preventing the fluids from flowing backward from the main path 2d toward the lead-in ports 2a. This operation of the reverse-stop valve 4 is performed separately for each of the paths connecting to the lead-in ports 2a. Therefore, even when there is a drop in the pressure state of fluids attempting to flow into the main body 1, the atmosphere in these paths is not contaminated by the mixed fluid flowing in the main path 2d.

The multi-path joint according to the embodiment of this invention described above obtains the following advantageous effects.

Since the reverse-stop valve 4 is fitted internally, the multi-path joint 1 can be made small and easy to install. The reverse-stop valve 4 maintains a proper operating state by preventing counterflow from the main path 2d to the lead-in ports 2a, and stabilizing the atmosphere on the lead-in ports side. This makes it possible to prevent chemical reactions, changes in fluid density, and the like, upstream from the multi-path joint 1, while mixing, discharging, or supplying the fluids correctly.

Further, since the plurality of blocks 30, 31, and 32, can be joined as required to form the multi-path joint 1, the multi-path joint 1 can easily be formed so as appropriately handle the number of fluids to be led in, and is therefore highly functional. This obtains advantages of being able to shorten the time taken to manufacture and supply the customer with the multi-path joint 1, and reduces the stock of multi-path joints on the manufacturing side.

By providing the connecting sections, the positions for connecting the blocks 30, 31, and 32 can be stipulated, making the multi-path joint 1 easier to assemble and more rigid, and also increasing its airtight sealing properties. Further, it becomes easier to position all the sections for the main path 2d that are divided around a single axis, enabling the mixed fluid to flow smoothly along the main path 2d without leaking.

By using ultrasonic waves to join the first case 30a to the second case 30b, the reverse-stop valve 4 can be fitted easily and accurately, enabling the assembly operation to be performed speedily. This brings the same advantage mentioned above, of being able to shorten the time taken to manufacture and supply the customer, while reducing the stock of multi-path joints on the manufacturing side.

Figure 4:
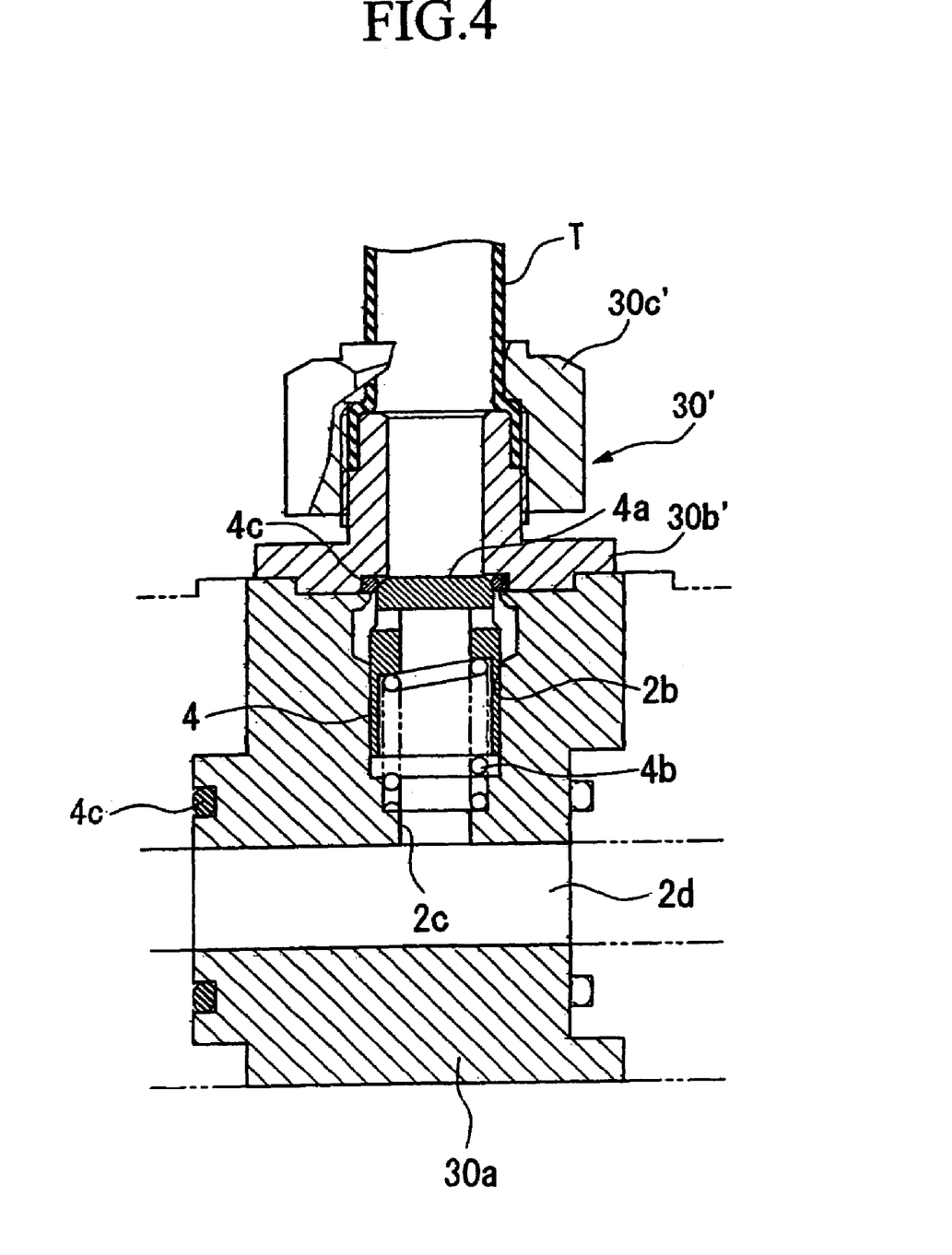
FIG. 4 is a cross-sectional view to illustrate one modification of one block forming the multi-path joint shown in FIG. 2.
Figure 5:
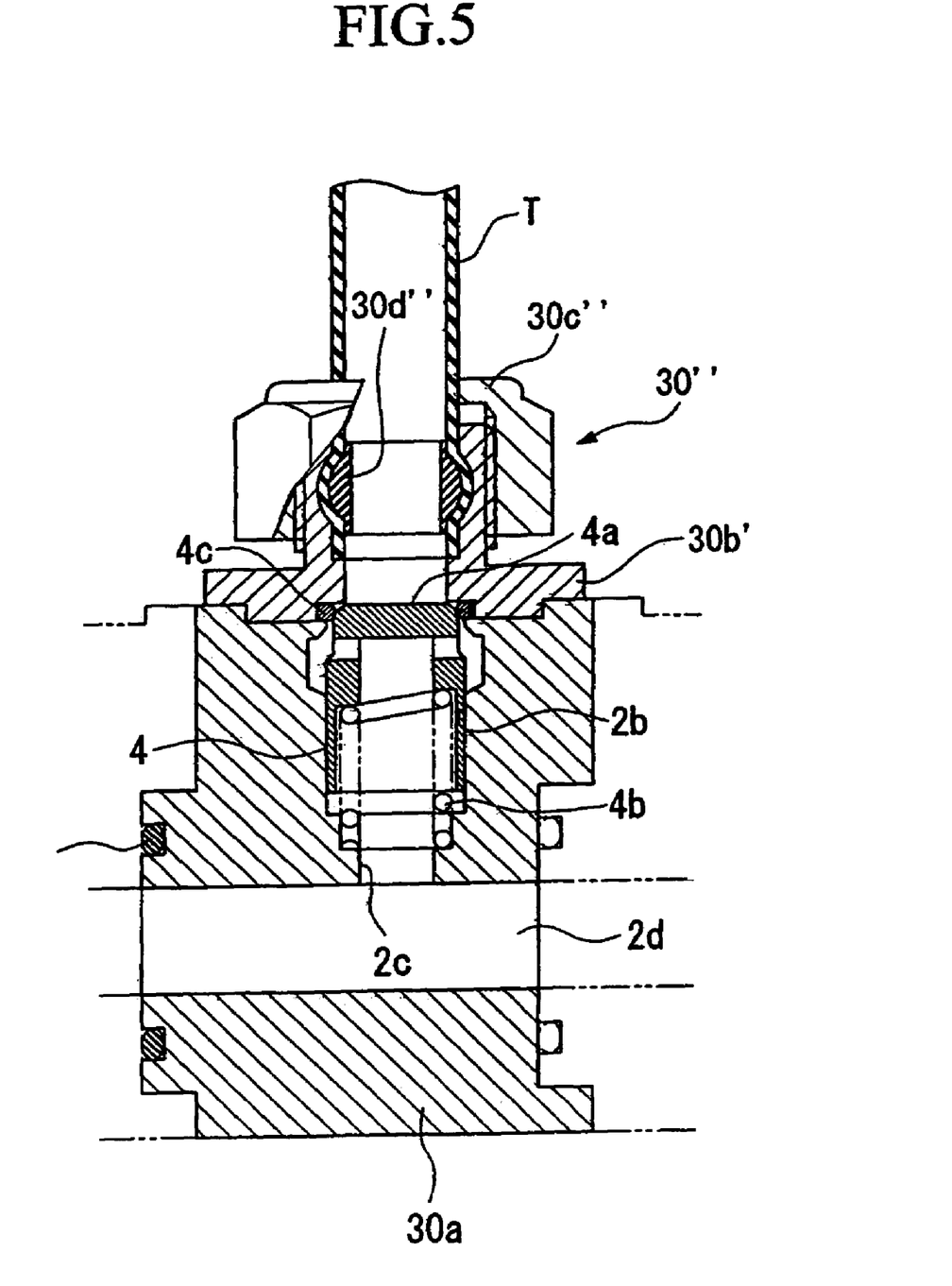
FIG. 5 is a cross-sectional view to illustrate another modification of one block forming the multi-path joint shown in FIG. 2.

The second case 30b of blocks 30 described in the above embodiment can be modified as shown in FIGS. 4 and 5 so as to handle any given connection state.

The second case 30b' of block 30' shown in FIG. 4 is joined to the first case 30a by ultrasonic waves in the same way as described above. The second case 30b' has a path in its central section, and a screw section in its outer peripheral section.

A tube T is inserted into the opening of the second case 30b', and is connected by securely tightening a nut 30c'.

In this way, the block 30' with the second case 30b' attached thereto can easily be joined and used together with the other blocks 30.

The second case 30b'' of block 30'' shown in FIG. 5 is joined to the first case 30a by ultrasonic waves in the same way as described above. The second case 30b'' also has a screw section in its outer peripheral section, and can be screw in place using a nut 30c''. Reference numeral 30d'' represents a ring, which, when the nut 30c'' is tightened maintains the grip between the second case 30b'' and the tube T, and the sealing properties of the contacting faces.

Furthermore, the tube having the ring 30d'' attached thereto is inserted into the opening of the second case 30b', and the second case 30b'', which can be secured by tightening the nut 30c'', is attached to the block 30'', enabling the block 30'' to be easily joined and used together with the other blocks 30 and 30'.

What is claimed is:
1. A multi-path joint comprising, in a housing:
  a plurality of lead-in ports for leading in a plurality of fluids;
  a main path, connecting to each lead-in port and joining the fluids together;
  a lead-out port, leading out mixed fluid from the inside of the main path;

the housing being divided into a plurality of sections in correspondence with the number of the lead-in ports;

a reverse-stop valve being provided between the lead-in ports and the main path, the reverse-stop valve preventing counterflow of the mixed fluid from the main path;

a connecting section provided in each of blocks formed by dividing the housing, the connecting sections positioning each block in respect to its adjoining blocks; and a holding unit for connecting all the blocks in their respective connecting sections and maintaining a connected state, wherein each block formed by dividing the housing comprising a first case having an attachment groove for the reverse-stop valve and part of the main path, and a second case having the lead-in ports;

a sealing member being provided at an opening of the second case corresponding to the lead-in ports.

2. A multi-path joint according to claim 1, wherein each block formed by dividing the housing comprising a first case having an attachment groove for the reverse-stop valve and part of the main path, and a second case having the lead-in ports;

a sealing member being provided at an opening of the second case corresponding to the lead-in ports.

3. A multi-path joint according to claim 1, wherein the first case and the second case are joined by applying ultrasonic waves to the contacting portion of the first case and the second case.

4. A multi-path joint according to claim 2, wherein the first case and the second case are joined by applying ultrasonic waves to the contacting portion of the first case and the second case.

5. A multi-path joint according to claim 1, wherein the holding unit is composed of a through-hole which passes through all the blocks of the main body in parallel to an axis of the main path, a pipe which has approximately the same length as the main body and is inserted into the through-hole, and bolts which are screwed into screw grooves which are opened in both end faces of the pipe.

6. A multi-path joint according to claim 2 wherein the holding unit is composed of a through-hole which passes through all the blocks of the main body in parallel to an axis of the main path, a pipe which has approximately the same length as the main body and is inserted into the through-hole, and bolts which are screwed into screw grooves which are opened in both end faces of the pipe.

7. A multi-path joint according to claim 4, wherein the holding unit is composed of a through-hole which passes through all the blocks of the main body in parallel to an axis of the main path, a pipe which has approximately the same length as the main body and is inserted into the through-hole, and bolts which are screwed into screw grooves which are opened in both end faces of the pipe.

8. A multi-path joint according to claim 1, wherein the housing is divided correspond to the number of the lead-in ports so that there is one section for each lead-in port.

9. A multi-path joint according to claim 1, wherein the housing is divided correspond to the number of the lead-in ports so that there is one section for each lead-in port.

10. A multi-path joint according to claim 1, wherein the housing is divided correspond to the number of the lead-in ports so that there is one section for each lead-in port.

11. A multi-path joint according to claim 2, wherein the housing is divided correspond to the number of the lead-in ports so that there is one section for each lead-in port.

12. A multi-path joint according to claim 3, wherein the housing is divided correspond to the number of the lead-in ports so that there is one section for each lead-in port.

13. A multi-path joint according to claim 4, wherein the housing is divided correspond to the number of the lead-in ports so that there is one section for each lead-in port.

14. A multi-path joint according to claim 5, the housing is divided correspond to the number of the lead-in ports so that there is one section for each lead-in port.

15. A multi-path joint according to claim 6, the housing is divided correspond to the number of the lead-in ports so that there is one section for each lead-in port.

16. A multi-path joint according to claim 7, the housing is divided correspond to the number of the lead-in ports so that there is one section for each lead-in port.

* * * * *